Oct. 17, 1950 L. H. BROWNE Re. 23,283

SHAFT SEAL

Original Filed Jan. 18, 1940

INVENTOR.
Lindsay H. Browne.

BY Van Deventer + Grier.

ATTORNEYS.

Reissued Oct. 17, 1950

Re. 23,283

UNITED STATES PATENT OFFICE 23,283

SHAFT SEAL

Lindsay H. Browne, Fairfield County, Conn., assignor, by mesne assignments, to The Fawick Airflex Company, Inc., Cleveland, Ohio, a corporation of Indiana Original No. 2,270,928, dated January 27, 1942, Serial No. 314,486, January 18, 1940. Application for reissue April 12, 1950, Serial No. 155,542

8 Claims. (Cl. 285—97.3)

Matter enclosed in heavy brackets [ ] appears in the original patent but forms no part of this reissue specification; matter printed in italics indicates the additions made by reissue This invention relates to improvements in shaft seals and is directed particularly toward shaft seals between shafts in alignment with each other whereby a fluid medium may pass from a passage in one rotating shaft to a passage in another shaft, whether the last shaft is rotating or not.

The principal object of the invention is the provision of a shaft seal to be applied to the end of a rotating shaft for supplying air or any other fluid medium to a passage in said shaft from an external source, said seal including anti-friction bearings for reducing the friction to a minimum and thereby increasing the overall efficiency of the seal.

Another object of the invention is the provision of an end shaft seal in which anti-friction bearings are employed between the rotary member and the stationary member, and in which a running seal is effected between the inner and the outer races of the bearings.

A further object of the invention is the provision of an end shaft seal in which anti-friction bearings are provided between the stationary and the rotary member, a running seal being provided between the inner and the outer races of the bearing and so positioned relative to the latter that the anti-friction elements are not subjected to the fluid-medium conveyed.

Other objects will be apparent to those skilled in the art upon a perusal of the following specification and the accompanying drawing.

Figure 1:
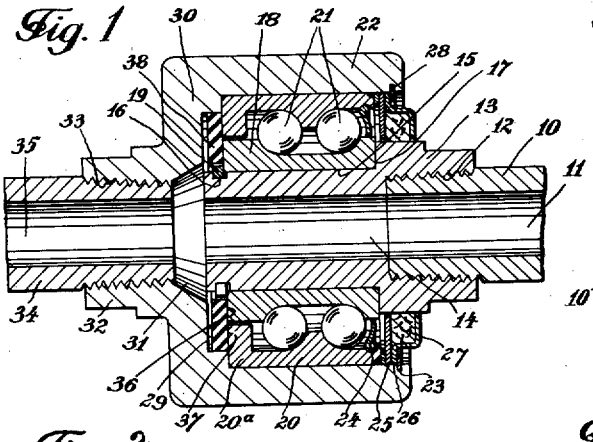
Figure 1 is a cross-sectional elevation of one embodiment of the invention.
Figure 2:
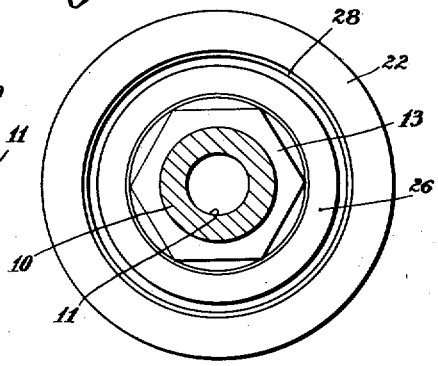
Figure 2 is an end view of the shaft seal of Figure 1 as seen from the right end thereof.

Referring to Figure 1, a rotating shaft 10 having a hollow passage 11 therein carries threads 12 at the end thereof. A hub member 13 has a threaded hole matching the threads 12, and a passage 14 therethrough communication with the passage 11. The hub 13 has a portion 15 of reduced diameter and the portion 15 has a groove 16 therein near the end thereof. In reducing the portion 15 of the hub, a shoulder 17 is formed.

The inner race 18 of a ball bearing is pressed on the reduced portion 15 and abuts the shoulder 17. A spring retaining ring 19 is snapped into the groove 16 for retaining the race on 15.

The outer race 20 of the ball bearing has an end portion 20a extending radially toward the inner race 18, and a plurality of balls 21 are circumferentially disposed between the two races. Although ball bearings are shown, it is obvious that rollers, needles or any other type of non-friction bearing may be used.

Embracing the outer race 20 is the cylindrical wall 22 of a cup-shaped member. Near the open end of the cylindrical wall is formed an annular groove 23. Within the opening of the cylindrical wall may be mounted a spacing ring 24, a grease retaining ring 25 and a cup-shaped member 26. The space between the members 25 and 26 may be filled with an annular dust-proof wick 27. The annular groove 23 carries a spring retaining ring 28 for retaining the members 24, 25, and 26 in the open end of the cylindrical wall 22. A recess 29 is formed within the hub portion 30 of the cup-shaped member, the purpose of which will presently be described.

Communicating with the recess 29 is a tapered passage 31. The hub 30 has a portion 32 of reduced diameter with a threaded hole 33 formed therein which fits the threaded end of a conduit 34. The conduit 34 has a passage 35 therein which communicates with the tapered passage 31 so that when the conduit 34 is connected to a source of fluid medium under pressure, for example, compressed air, the air may flow through the passages 35, 31, 14 and thence via the passage 11 to some member to be controlled carried on the moving shaft 10. The end surface 36 on the inner race 18 and the end surface 37 on the portion 20a on the outer race, constitute sealing surfaces which are engaged by a sealing ring 38. From this arrangement, it may be seen that the balls or other anti-friction elements of the bearing are not subjected to the pressure of the fluid medium passing through the seal. The ball bearings may be packed with lubricant and some of this lubricant, in addition to lubricating the bearing may also lubricate the sealing surfaces of the races.

Figure 3:
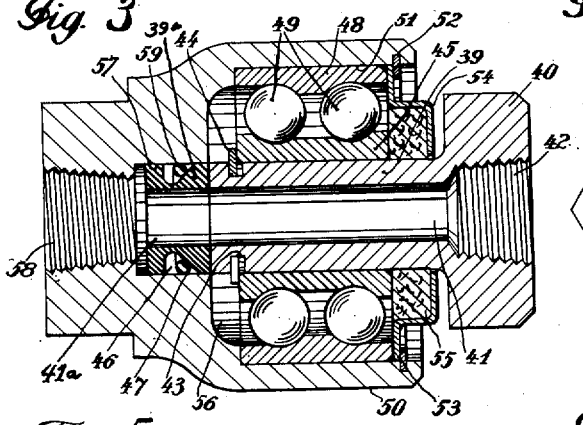
Figure 3 is a sectional elevation of a shaft seal embodying a further modification of the invention.
Figure 4:
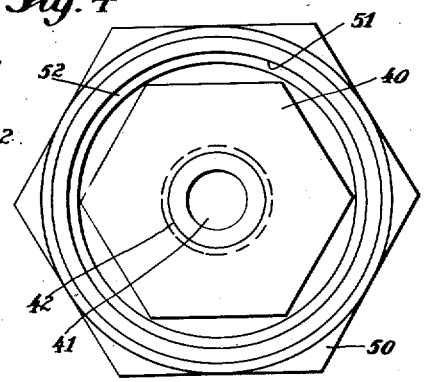
Figure 4 is a right end view of the seal shown in Figure 3.

In the embodiment shown in Figure 3, the member to be secured to the end of a rotating shaft consists of a tubular member 39 having an enlarged hexagonal portion 40. A passage 41 extends longitudinally through the tubular body 39 and communicates with the threaded hole 42 matching the threads on a rotating shaft such as the shaft 10 shown in Figure 1.

An annular groove 43 is formed in the tubular body and carries a spring ring 44 to limit the position of the inner race 45 of the ball bearing. Abutting the tubular body 39 in sealed relation, is a tubular member 39a, formed of "Synthane" or other oil resistant resilient material. The tubular member 39a has formed therein a groove 46. This groove has one edge with a surface at right angles to the axis of the tubular member and a second surface designated by the numeral 47 angular with respect to the axis of the tubular member. The member 39a also has a passage 41a therein communicating with the passage 41.

The outer race 48 is concentric with the inner race 45 and a plurality of balls 49 therebetween forms an anti-friction bearing. A stator 50 has a counterbored portion 51 fitting the outer race 48. A groove 52 formed in the counterbored portion 51 carries a retaining ring 53 for retaining the outer race 48 therein.

A cup-shaped member 54 has a flanged portion between the retaining ring 53 and the race 48 and carries a suitable dust-tight packing 55. Adjoining the counterbored portion 51 in the stator is a recess 56. Communicating with the recess 56 is a sealing bore 57, and a threaded hole 58 communicates with the bore 57 so that compressed air or any other fluid medium under pressure may be connected to the stator and may pass therethrough via the passage 41 and into the rotating shaft to which the new and improved sealing device is connected.

A sealing ring 59 is mounted in the groove 46 and under the influence of the pressure of the fluid medium this ring is urged along the slanting surface 47. Due to this urging, the sealing ring 59 is maintained in sealing contact with the surface of the bore 57 and the slanting surface 47.

In this arrangement the peripheral speed of the sealing surfaces is low due to the small diameters of the surfaces 47 and 57.

Figure 5:
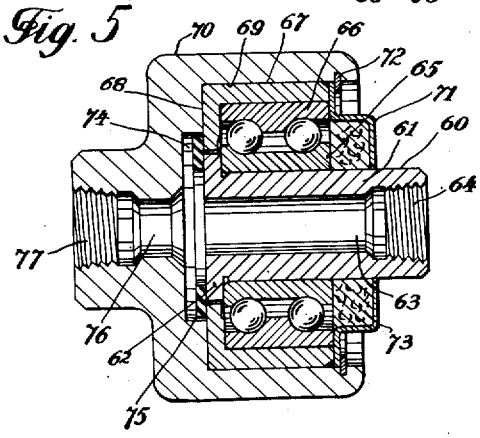
Figure 5 is a cross-section of an end shaft seal in which a running seal is effected between the surfaces of fittings devised to contain the races of a ball bearing.
Figure 6:
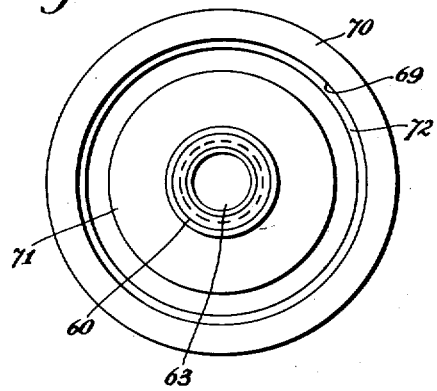
Figure 6 is a right end view of the seal shown in Figure 5.

Referring now to Figure 5, it will be noted that the sealing is effected between members carrying the races of the ball bearings instead of between the ends of the races per se, as shown in Figure 1.

In Figure 5, the rotor 50 has a tubular portion 61 adjoining a flanged portion 62. A longitudinal passage 63 is formed in the stator 60, and a threaded hole 64 formed therein communicates with the passage 63. The ball bearing is pressed on the tubular portion 61 until the inner race 65 abuts the shoulder 62. The outer race 66 is pressed into a cup-shaped member 67 until it abuts the inwardly extending flanged portion 68. A stator 70 has a bore 69 into which the cup-shaped member 67 is formed. The rim of a dust-seal holder 71 abuts the outer race 66 and the face of the cup-shaped member 67 and all three of these members are retained within the bore 69 by a spring ring 72. Suitable packing 73 is mounted in the holder 71. The stator 70 has a counterbored portion 74 which forms a clearance for the sealing ring 75 which conducts and forms a fluid-tight seal with the substantially parallel end surfaces of the flanges 62 and 68. Communicating with the counterbored portion is a passage 76, and a threaded hole 77 communicates therewith. The seal may be mounted on a rotating shaft similar to the shaft 10 and the stator may be connected to a source of compressed air or other fluid medium under pressure, and the fluid medium is supplied to the passage in the moving shaft via the passages 76 and 63. The sealing ring 75 is subjected to pressure and the seal between it and the surfaces of the flanges 62 and 68 are thereby maintained in sealed relation.

Although I have herein shown and described three modifications of my new and improved shaft seal, all of which show the non-friction bearings external to the pressure of the fluid medium, so that the lubrication thereof is simplified, it is obvious that these bearings may be subjected to the pressure of the fluid medium and that many other changes may be made in the arrangement shown and described, without departing from the spirit of the invention as set forth in the following claims.

What is claimed is:

1. In a rotary shaft seal for a shaft having a longitudinal passage therein, the combination with a hub member adapted to be secured in fluid tight relation to the end of said shaft, a tubular shank portion formed integral therewith, a longitudinal passage extending through said hub and shank, said hub member and said shank portion forming a rotor, an anti-friction bearing having an inner race mounted on said shank portion, a stator having a cup-shaped portion embracing an outer race of said bearing and a hub portion adapted to be connected to a source of fluid medium under pressure, a longitudinal passage formed in said stator for leading said fluid medium to said other passages, a tubular member having an external groove formed therein one edge of which is conical in form, said tubular member being positioned in the passage in said stator and abutting the end of said tubular shank in sealed relation, and an annular sealing ring positioned in said groove and adapted to be wedged between said conical surface and the interior of said last-mentioned passage under the urge of the pressure of said fluid medium.

2. In a rotary shaft seal for a shaft having a longitudinal passage therein, the combination with a hub member adapted to be secured in fluid tight relation to the end of said shaft, a tubular shank portion formed integral with said hub, a longitudinal passage extending through said hub and shank, said hub member and said shank portion forming a rotor, a stator having a cup-shaped portion and a hub portion adapted to be connected to a source of fluid medium under pressure, a longitudinal passage formed in said stator for leading said fluid medium to said other passages, bearing means between said shank portion and said cup-shaped portion, a tubular member positioned in the passage in said stator and having one end in sealing relation with the end of said tubular shank, a V-shaped groove in said tubular member, and a ring member positioned in said groove in said tubular member and subjected to the urge of the pressure of said fluid medium for contacting and maintaining a seal between said tubular member and the interior wall of the passage in said stator.

3. In a rotary shaft seal for a shaft having a passage therein, a rotor member having its outer end adapted to be secured in fluid tight relation to the end of said shaft and having a sealing face formed on its inner end, a stator including a cup-shaped portion, said stator being adapted to be connected to a source of fluid medium under pressure, an anti-friction bearing having an inner race secured to said rotor and an outer race embraced by the cup-shaped portion of said stator, connected passages formed in said stator and said rotor in line with each other and concentric with the axis of said shaft seal whereby said fluid medium may flow therethrough to the passage in said shaft, a tubular sealing member positioned in the passage in said stator and having one end in sealing relation with said sealing face on said rotor member, a shoulder on said tubular sealing member, a free annular sealing ring cooperating with said shoulder on the tubular sealing member and with the interior wall of the passage in said stator and forced into intimate contact with said shoulder and said wall by the pressure of said fluid medium for maintaining a seal between said stator and said tubular sealing member, and a dust-tight shield in said stator between the outside air and said anti-friction bearing and including wick material contacting said rotor.

4. In a rotary shaft seal for a shaft having a longitudinal passage therein, the combination with a hub member adapted to be secured in fluid tight relation to the end of said shaft, a tubular shank portion formed integral therewith, a longitudinal passage extending through said hub and shank, said hub member and said shank portion forming a rotor, an anti-friction bearing having an inner race mounted on said shank portion, a stator having a cup-shaped portion embracing an outer race of said bearing and a hub portion adapted to be connected to a source of fluid medium under pressure, a longitudinal passage formed in said stator for leading said fluid medium to said other passages, a tubular member formed of resilient material and having an external groove formed therein one edge of which is conical in form, said tubular member being positioned in the passage in said stator and abutting the end of said tubular shank in sealed relation, and an annular sealing ring positioned in said groove and adapted to be wedged between said conical surface and the interior of said last-mentioned passage under the urge of the pressure of said fluid medium.

*5. A combination as defined in claim 1 in which the specified sealing ring is of substantially circular and uniform cross-sectional shape and size and is of such resilience as to be wedged as specified by reason of being urged along the specified conical surface; and in which means is provided for so limiting relative axial movement of the said rotor and the said stator that they and said means constitute a self-contained assembly adapted to be handled as a unit in mounting them upon the defined shaft.*

*6. A combination as defined in claim 1 in which the specified sealing ring is of substantially circular and uniform cross-sectional shape and size and is of such resilience as to be wedged as specified by reason of being urged along the specified conical surface; and in which means is provided, including anti-friction thrust-bearing means, for so limiting relative axial movement of the said rotor and the said stator that they and said means constitute a self-contained assembly adapted to be handled as a unit in mounting them upon the defined shaft.*

*7. A sealing device for attachment to a hollow rotary shaft for conducting fluid into the shaft, said device comprising a fluid-conducting rotor structure adapted to seal against the shaft and to be secured to the shaft for rotation therewith, a fluid-conducting stator structure adapted to be connected to a non-rotating, fluid-conducting means for conducting fluid therefrom into said rotor structure, one of said structures having an annular, axially facing slip-seal surface and the other of said structures having an annular, axially-guiding surface coaxially aligned with the said slip-seal surface, an annular, fluid-conducting, slip-seal member mating with said slip-seal surface and slidably associated with said axially-guiding surface, a resilient sealing ring mounted between said axially-guiding surface and said slip-seal member, and radial and thrust bearing means so interposed between said rotor structure and said stator structure that it holds them centered with relation to each other and also prevents their axial separation, thus constituting them a self-contained assembly adapted to be handled as a unit in securing them to the shaft.*

*8. A sealing device for attachment to a hollow rotary shaft for conducting fluid into the shaft, said device comprising a fluid-conducting rotor structure adapted to seal against the shaft and to be secured to the shaft for rotation therewith, a fluid-conducting stator structure adapted to be connected to a non-rotating, fluid-conducting means for conducting fluid therefrom into said rotor structure, one of said structures having an annular, axially facing slip-seal surface and the other of said structures having an annular, axially-guiding surface coaxially aligned with the said slip-seal surface, an annular, fluid-conducting, slip-seal member mating with said slip-seal surface and slidably associated with said axially-guiding surface, a resilient, circular-section sealing ring mounted between said axially-guiding surface and said slip-seal member and self-energized by the fluid pressure for sealing against both of them, one of them being formed with an annular recession surface for accomodating said sealing ring, and radial and thrust bearing means so interposed between said rotor structure and said stator structure that it holds them centered with relation to each other and also prevents their axial separation, thus constituting them a self-contained assembly adapted to be handled as a unit in securing them to the shaft.*

LINDSAY H. BROWNE.

No references cited in Reissue.